United States Patent
Iwata et al.

(10) Patent No.: US 7,969,588 B2
(45) Date of Patent: Jun. 28, 2011

(54) IMAGE FORMING DEVICE AND CONTROL METHOD THEREFOR

(75) Inventors: Nobuyuki Iwata, Kawasaki (JP); Yasuyuki Igarashi, Kawasaki (JP); Tomoyuki Takahira, Yokohama (JP); Saori Iura, Tokyo (JP); Yasuharu Yanamura, Yokohama (JP)

(73) Assignee: Ricoh Company Limited, Tokyo (JP)

( * ) Notice: Subject to any disclaimer, the term of this patent is extended or adjusted under 35 U.S.C. 154(b) by 749 days.

(21) Appl. No.: 12/040,173

(22) Filed: Feb. 29, 2008

(65) Prior Publication Data
US 2008/0212137 A1 Sep. 4, 2008

(30) Foreign Application Priority Data

Mar. 1, 2007 (JP) .................................. 2007-051376
Apr. 9, 2007 (JP) .................................. 2007-101481

(51) Int. Cl.
*G06F 3/12* (2006.01)
*H04N 1/40* (2006.01)

(52) U.S. Cl. ...................................... 358/1.13; 358/471

(58) Field of Classification Search .................. 358/471, 358/400, 401, 444, 404, 1.16, 1.13
See application file for complete search history.

(56) References Cited

U.S. PATENT DOCUMENTS

| 6,781,782 B2 * | 8/2004 | Rochat et al. ................... 360/75 |
| 2008/0155370 A1 * | 6/2008 | Kadomatsu ................... 714/747 |
| 2008/0183729 A1 * | 7/2008 | Wakazono ................... 707/100 |

FOREIGN PATENT DOCUMENTS

JP     2006-35768     2/2006

\* cited by examiner

*Primary Examiner* — Jerome Grant, II
(74) *Attorney, Agent, or Firm* — Oblon, Spivak, McClelland, Maier & Neustadt, L.L.P.

(57) ABSTRACT

An image forming device includes a control unit configured to control by sorting common setting information valid among a plurality of devices and specific setting information valid for a specific device, an internal storage device configured to store setting data that includes a pair of setting data of identification information indicating a type of setting item and setting values, an external storage device controller configured to control to input and output the setting data with a detachable external storage device, and a selective-write device configured to select and write the setting data read from the external storage device based on the predetermined criteria.

8 Claims, 9 Drawing Sheets

| SETTING ITEM | ID | SETTING VALUE | UPDATE FLAG (TRANSMISSION/RECEIVE) |
|---|---|---|---|
| RECEIVE BUFFER | 00001 | 128KB | O / × |
| IP ADDRESS | 00002 | 133. 139. 012. 059 | × / × |
| SUBNET MASK | 00003 | 000. 000. 000. 000 | × / × |
| GATE WAY ADDRESS | 00004 | 000. 000. 000. 000 | × / × |
| BIDIRECTIONAL COMMUNICATION | 00005 | ON | O / × |
| ⋮ | ⋮ | ⋮ | ⋮ |
| TRAY 1 PAPER SIZE | 10001 | A4 VERTICAL | O / O |
| TRAY 2 PAPER SIZE | 10002 | A3 HORIZONTAL | O / O |
| TRAY 3 PAPER SIZE | 10003 | --- | --- |
| TRAY 1 PAPER TYPE | 10004 | LABEL PAPER | O / O |
| TRAY 2 PAPER TYPE | 10005 | NORMAL PAPER | O / O |
| TRAY 3 PAPER TYPE | 10006 | --- | --- |
| ⋮ | ⋮ | ⋮ | ⋮ |
| ERROR REPORT PRINT ON/OFF | 20001 | --- | --- |
| DOUBLE-SIDE PRINTING ON/OFF | 20002 | ON | O / × |
| HALF TURN ON/OFF | 20003 | --- | --- |
| OPERATION BUZZER SOUND ON/OFF | 20004 | OFF | O / O |

| SETTING ITEM | ID | SETTING VALUE | UPDATE FLAG (TRANSMISSION/RECEIVE) |
|---|---|---|---|
| RECEIVE BUFFER | 00001 | 256KB | O / × |
| IP ADDRESS | 00002 | 133. 139. 011. 003 | × / × |
| SUBNET MASK | 00003 | 000. 000. 000. 000 | × / × |
| GATE WAY ADDRESS | 00004 | 000. 000. 000. 000 | × / × |
| BIDIRECTIONAL COMMUNICATION | 00005 | OFF | O / × |
| ⋮ | ⋮ | ⋮ | ⋮ |
| TRAY 1 PAPER SIZE | 10001 | B4 VERTICAL | O / O |
| TRAY 2 PAPER SIZE | 10002 | B4 HORIZONTAL | O / O |
| TRAY 3 PAPER SIZE | 10003 | B3 VERTICAL | O / O |
| TRAY 1 PAPER TYPE | 10004 | NORMAL PAPER | O / O |
| TRAY 2 PAPER TYPE | 10005 | RECYCLE PAPER | O / O |
| TRAY 3 PAPER TYPE | 10006 | NORMAL PAPER | O / O |
| ⋮ | ⋮ | ⋮ | ⋮ |
| ERROR REPORT PRINT ON/OFF | 20001 | ON | O / O |
| DOUBLE-SIDE PRINTING ON/OFF | 20002 | ON | O / × |
| HALF TURN ON/OFF | 20003 | ON | O / × |
| OPERATION BUZZER SOUND ON/OFF | 20004 | ON | O / O |

| INTERCOMMUNITY | SETTING ITEM | ID |
|---|---|---|
| COMMON | IP ADDRESS | COM-001 |
| COMMON | SUBNET MASK | COM-002 |
| COMMON | DOUBLE-SIDE PRINTING ON/OFF | COM-003 |
| COMMON | HALF-TURN ON/OFF | COM-004 |
| COMMON | OPERATION BUZZER SOUND ON/OFF | COM-005 |
| | : | |
| DEVICE A | TRAY 1 PAPER SIZE | A-001 |
| DEVICE A | TRAY 2 PAPER SIZE | A-002 |
| DEVICE A | TRAY 3 PAPER SIZE | A-003 |
| DEVICE A | TRAY 1 PAPER TYPE | A-004 |
| DEVICE A | TRAY 2 PAPER TYPE | A-005 |
| DEVICE A | TRAY 3 PAPER TYPE | A-006 |
| | : | |
| DEVICE B | TRAY 1 PAPER SIZE | B-001 |
| DEVICE B | TRAY 2 PAPER SIZE | B-002 |
| DEVICE B | TRAY 1 PAPER TYPE | B-003 |
| DEVICE B | TRAY 2 PAPER TYPE | B-004 |
| | : | |

FIG. 2B

| ID | VALUE |
|---|---|
| COM-001 | 123.123.11.22 |
| COM-002 | 255.255.255.000 |
| COM-003 | 1(On) |
| COM-005 | 1(On) |
| : | |
| A-001 | A4 |
| A-002 | A3R |
| A-003 | A4R |
| A-004 | THICK PAPER |
| A-005 | NORMAL PAPER |
| A-006 | COLORED PAPER |
| : | |

FIG. 2C

| ID | VALUE |
|---|---|
| COM-001 | 123.123.11.22 |
| COM-002 | 255.255.255.000 |
| COM-004 | NO CORRESPONDING DATA |
| COM-005 | 1(On) |
| : | |
| B-001 | NO CORRESPONDING DATA |
| B-002 | NO CORRESPONDING DATA |
| B-003 | NO CORRESPONDING DATA |
| B-004 | NO CORRESPONDING DATA |
| : | |

FIG. 2D

| ID | VALUE |
|---|---|
| COM-001 | 000.000.000.000 |
| COM-002 | 000.000.000.000 |
| COM-004 | 0(Off) |
| COM-005 | 1(On) |
| : | |
| B-001 | A4 |
| B-002 | A4 |
| B-003 | NORMAL PAPER |
| B-004 | NORMAL PAPER |
| : | |

FIG. 2E

| ID | VALUE |
|---|---|
| COM-001 | 123.123.11.22 |
| COM-002 | 255.255.255.000 |
| COM-004 | 0(Off) |
| COM-005 | 1(On) |
| : | |
| B-001 | A4 |
| B-002 | A4 |
| B-003 | NORMAL PAPER |
| B-004 | NORMAL PAPER |
| : | |

| SETTING ITEM | ID | SETTING VALUE | UPDATE FLAG (TRANSMISSION/RECEIVE) |
|---|---|---|---|
| RECEIVE BUFFER | 00001 | 128KB | O/× |
| IP ADDRESS | 00002 | 133. 139. 012. 059 | ×/× |
| SUBNET MASK | 00003 | 000. 000. 000. 000 | ×/× |
| GATE WAY ADDRESS | 00004 | 000. 000. 000. 000 | ×/× |
| BIDIRECTIONAL COMMUNICATION | 00005 | ON | O/× |
| : | : | : | : |
| TRAY 1 PAPER SIZE | 10001 | A4 VERTICAL | O/O |
| TRAY 2 PAPER SIZE | 10002 | A3 HORIZONTAL | O/O |
| TRAY 3 PAPER SIZE | 10003 | --- | --- |
| TRAY 1 PAPER TYPE | 10004 | LABEL PAPER | O/O |
| TRAY 2 PAPER TYPE | 10005 | NORMAL PAPER | O/O |
| TRAY 3 PAPER TYPE | 10006 | --- | --- |
| : | : | : | : |
| ERROR REPORT PRINT ON/OFF | 20001 | --- | --- |
| DOUBLE-SIDE PRINTING ON/OFF | 20002 | ON | O/× |
| HALF TURN ON/OFF | 20003 | --- | --- |
| OPERATION BUZZER SOUND ON/OFF | 20004 | OFF | O/O |

FIG. 4B

| SETTING ITEM | ID | SETTING VALUE | UPDATE FLAG (TRANSMISSION/RECEIVE) |
|---|---|---|---|
| RECEIVE BUFFER | 00001 | 256KB | O/× |
| IP ADDRESS | 00002 | 133. 139. 011. 003 | ×/× |
| SUBNET MASK | 00003 | 000. 000. 000. 000 | ×/× |
| GATE WAY ADDRESS | 00004 | 000. 000. 000. 000 | ×/× |
| BIDIRECTIONAL COMMUNICATION | 00005 | OFF | O/× |
| : | : | : | : |
| TRAY 1 PAPER SIZE | 10001 | B4 VERTICAL | O/O |
| TRAY 2 PAPER SIZE | 10002 | B4 HORIZONTAL | O/O |
| TRAY 3 PAPER SIZE | 10003 | B3 VERTICAL | O/O |
| TRAY 1 PAPER TYPE | 10004 | NORMAL PAPER | O/O |
| TRAY 2 PAPER TYPE | 10005 | RECYCLE PAPER | O/O |
| TRAY 3 PAPER TYPE | 10006 | NORMAL PAPER | O/O |
| : | : | : | : |
| ERROR REPORT PRINT ON/OFF | 20001 | ON | O/O |
| DOUBLE-SIDE PRINTING ON/OFF | 20002 | ON | O/× |
| HALF TURN ON/OFF | 20003 | ON | O/× |
| OPERATION BUZZER SOUND ON/OFF | 20004 | ON | O/O |

FIG. 5A

| SETTING ITEM | ID | SETTING VALUE | UPDATE FLAG (TRANSMISSION/RECEIVE) |
|---|---|---|---|
| RECEIVE BUFFER | 00001 | 256KB | O/× |
| IP ADDRESS | 00002 | 133.139.011.003 | ×/× |
| SUBNET MASK | 00003 | 000.000.000.000 | ×/× |
| GATE WAY ADDRESS | 00004 | 000.000.000.000 | ×/× |
| BIDIRECTIONAL COMMUNICATION | 00005 | OFF | O/× |
| : | : | : | : |
| TRAY 1 PAPER SIZE | 10001 | A4 VERTICAL | O/O |
| TRAY 2 PAPER SIZE | 10002 | A3 HORIZONTAL | O/O |
| TRAY 3 PAPER SIZE | 10003 | B3 VERTICAL | O/O |
| TRAY 1 PAPER TYPE | 10004 | LABEL PAPER | O/O |
| TRAY 2 PAPER TYPE | 10005 | NORMAL PAPER | O/O |
| TRAY 3 PAPER TYPE | 10006 | NORMAL PAPER | O/O |
| : | : | : | : |
| ERROR REPORT PRINT ON/OFF | 20001 | ON | O/O |
| DOUBLE-SIDE PRINTING ON/OFF | 20002 | ON | O/× |
| HALF TURN ON/OFF | 20003 | ON | O/× |
| OPERATION BUZZER SOUND ON/OFF | 20004 | OFF | O/O |

FIG. 5B

| SETTING ITEM | ID | SETTING VALUE | UPDATE FLAG (TRANSMISSION/RECEIVE) |
|---|---|---|---|
| RECEIVE BUFFER | 00001 | 128KB | O/× |
| IP ADDRESS | 00002 | 133.139.011.003 | ×/× |
| SUBNET MASK | 00003 | 000.000.000.000 | ×/× |
| GATE WAY ADDRESS | 00004 | 000.000.000.000 | ×/× |
| BIDIRECTIONAL COMMUNICATION | 00005 | ON | O/× |
| : | : | : | : |
| TRAY 1 PAPER SIZE | 10001 | A4 VERTICAL | O/O |
| TRAY 2 PAPER SIZE | 10002 | A3 HORIZONTAL | O/O |
| TRAY 3 PAPER SIZE | 10003 | B3 VERTICAL | O/O |
| TRAY 1 PAPER TYPE | 10004 | LABEL PAPER | O/O |
| TRAY 2 PAPER TYPE | 10005 | NORMAL PAPER | O/O |
| TRAY 3 PAPER TYPE | 10006 | NORMAL PAPER | O/O |
| : | : | : | : |
| ERROR REPORT PRINT ON/OFF | 20001 | ON | O/O |
| DOUBLE-SIDE PRINTING ON/OFF | 20002 | ON | O/× |
| HALF TURN ON/OFF | 20003 | ON | O/× |
| OPERATION BUZZER SOUND ON/OFF | 20004 | OFF | O/O |

IMAGE FORMING DEVICE AND CONTROL METHOD THEREFOR

CROSS-REFERENCE TO RELATED APPLICATIONS

This application claims priority to Japanese Patent Applications No. 2007-051376, filed on Mar. 1, 2007, and No. 2007-101481, filed on Apr. 9, 2007, the entire contents of each of which are hereby incorporated by reference herein.

BACKGROUND

1. Field

The present invention relates to an image forming device such as a copier, a printer, and a facsimile machine, and a control method of controlling image forming devices.

2. Background Art

When a plurality of printers is delivered, each printer is generally set equally with the same setting data. This shipping method is known as "kitting". However, as the number of printers increases, it takes a lot of time for a manufacturer to install the setting data manually for all the printers one by one from the beginning to an end item. If failure or trouble occurs with a printer, a user temporally replaces that printer with a backup printer. Further, the printer must be set again from the beginning so that the printer can be used again for an extended period of time.

One example of a background-art printer employs a detachable memory card to store setting information. The setting information is loaded in a storage device mounted on a board. Even if a failure requiring replacement of the board occurs, one such example background image forming device called a label printer may recover easily in the following way: In the label printer, the setting and history information is stored in the storage device mounted on a board such as a SRAM (static random access memory). Further, the setting and the history information is also stored in the detachable memory card. A variety of setting information for controlling print-operation and history information related to print operation is stored in the memory card with a file format readable on computers such as a host computer, a personal computer, and so on.

In another image forming device, setting information, which is stored in an external storage device and valid only for the image forming device, is selectively downloaded. Thus, the image forming device can prevent wrong information from being applied to the image forming device because a backup operation with internal information of the image forming device using external storage device, a reconstruction operation, and a copy operation are properly performed.

Criteria information is stored in the internal storage device to determine whether or not information stored in the external storage device can be used for operation of the image forming device. An information-processing controller determines whether or not the information stored in the external storage device is the information to be used for the operation of the image forming device, based on the information stored in the internal storage device and the information stored in the external storage device. Further, the information stored in the external storage device is used only when the information-processing controller determines that the information stored in the external storage device is the information to be used for the operation of the image forming device.

However, in the background-art image forming device, the setting data (binary data) is stored in text format in the external storage device. Consequently, the setting data can only be transferred to another image forming device which uses the same text format.

SUMMARY

This patent specification describes a novel image forming device including a control unit configured to control by sorting common setting information valid among a plurality of devices and specific setting information valid for a specific device, an internal storage device configured to store setting data that includes a pair of setting IDs indicating a type of setting item and setting values, an external storage device controller configured to control to input and output the setting data with a detachable external storage device, and a selective-write device configured to select and write the setting data read from the external storage device based on the predetermined criteria.

This patent specification further describes a control method of controlling an image forming device that includes the steps of controlling by sorting common setting information valid among a plurality of image forming devices and specific setting information valid for a specific image forming device, storing setting data that includes a pair of IDs indicating a type of setting item and setting values, outputting the setting data to a detachable external storage device when necessary, reading the setting data from the detachable external storage device when necessary, selecting a setting value that is valid and consistent from the setting data read from the external storage device, and overwriting the setting value onto an initial value or current setting value stored in a setting storage device.

Further, this patent specification describes a control method of controlling image forming device that includes the steps of controlling by sorting common setting information valid among a plurality of image forming devices and specific setting information valid for a specific image forming device, storing setting data that includes setting IDs indicating a type of setting item, setting values, and renewal flag, outputting the setting data to the detachable external storage device when necessary, setting criteria to permit overwriting at predetermined permission information of the renewal flag, reading the setting data from the external storage device when necessary, and writing the setting value in the internal storage device in accordance with transmit-permission information or receive-permission information of the renewal flag.

BRIEF DESCRIPTION OF THE DRAWINGS

A more complete appreciation of the invention and many of the advantages thereof are obtained as the same becomes better understood by reference to the following detailed description when considered in connection with the accompanying drawings, wherein.

DETAILED DESCRIPTION

In describing the embodiments illustrated in the drawings, specific terminology is employed for the purpose of clarity. However, the disclosure of this patent specification is not intended to be limited to the specific terminology so used, and it is to be understood that substitutions for each specific element can include any technical equivalents that operate in a similar manner and achieve a similar result.

Referring now to the drawings, wherein like reference numerals designate identical or corresponding parts throughout the several views, a description is given of an example embodiment.

Figure 1A:
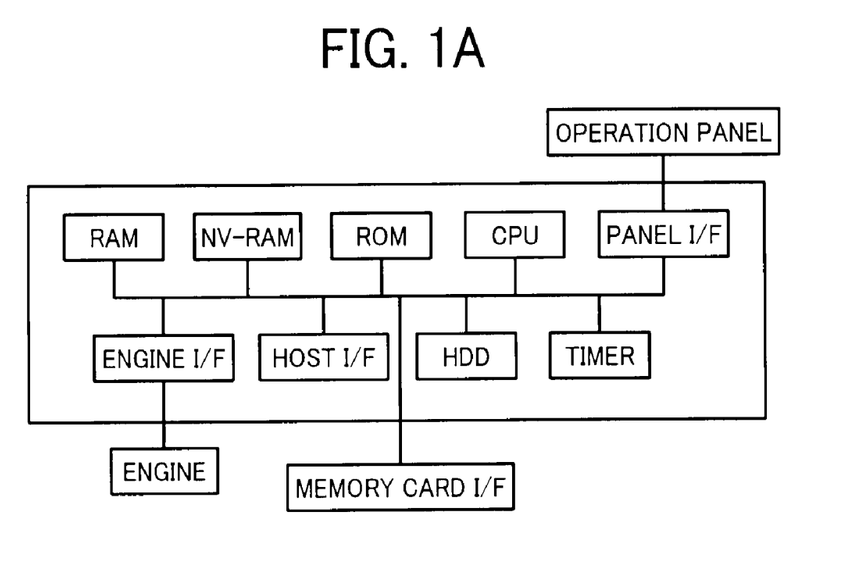
FIGS. 1A and 1B are block diagrams illustrating a configuration of a first example embodiment of an image forming device.
Figure 1B:
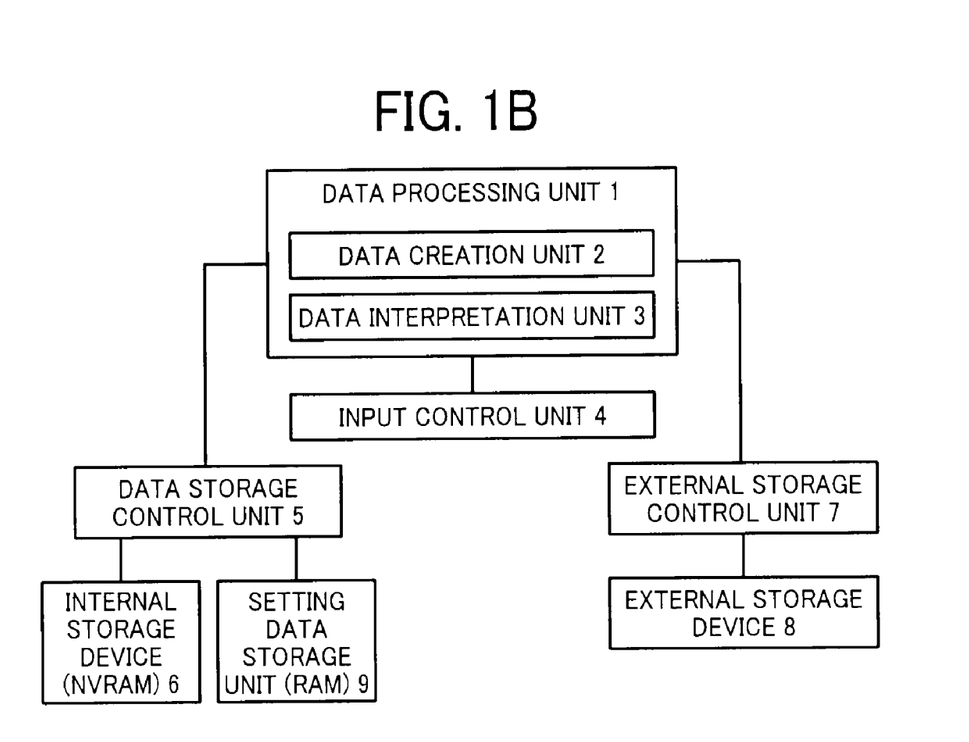
Figure 2A:
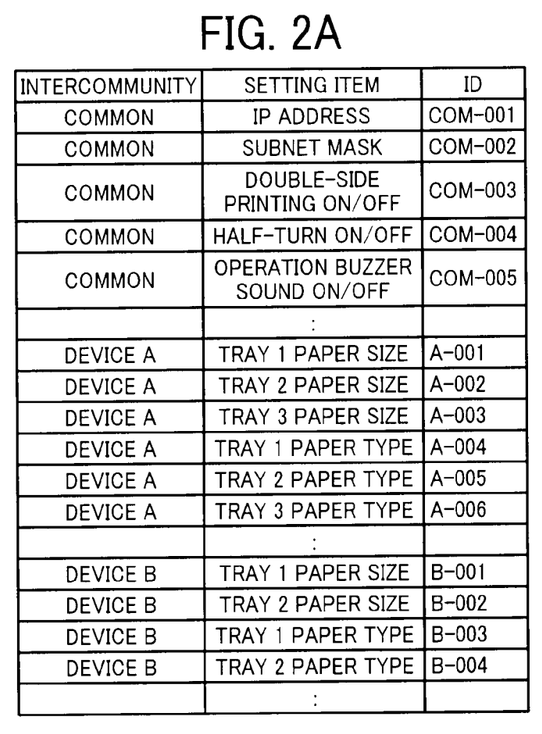
FIG. 2A is an ID (identification) assign table for setting items.
Figure 2B:
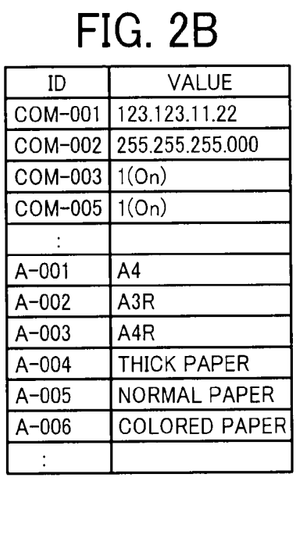
FIG. 2B is a table representing setting data for an image forming device A.
Figure 2C:
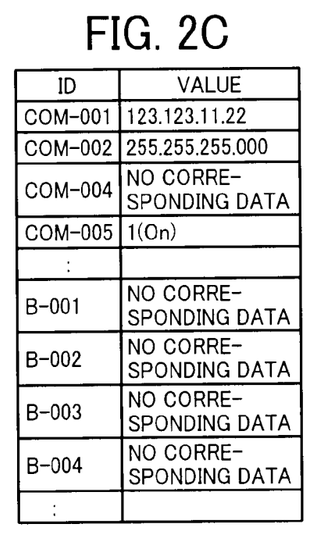
FIG. 2C is a table representing setting data status loaded for an image forming device B.
Figure 2D:
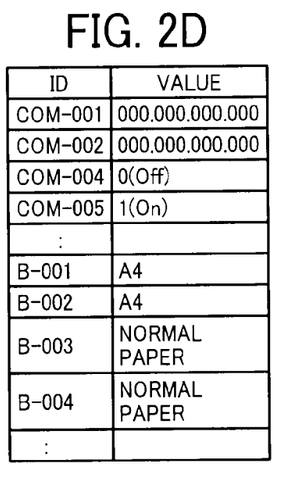
FIG. 2D is a table representing initial values of the setting data for the image forming device B.
Figure 2E:
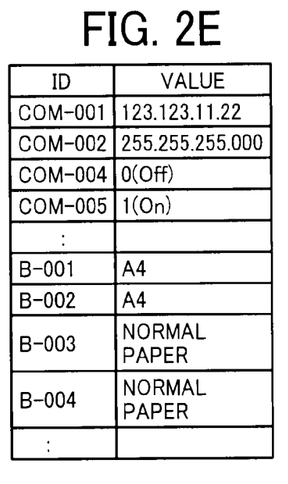
FIG. 2E is a table representing reflected results of the setting data for the image forming device B.
Figure 3A:
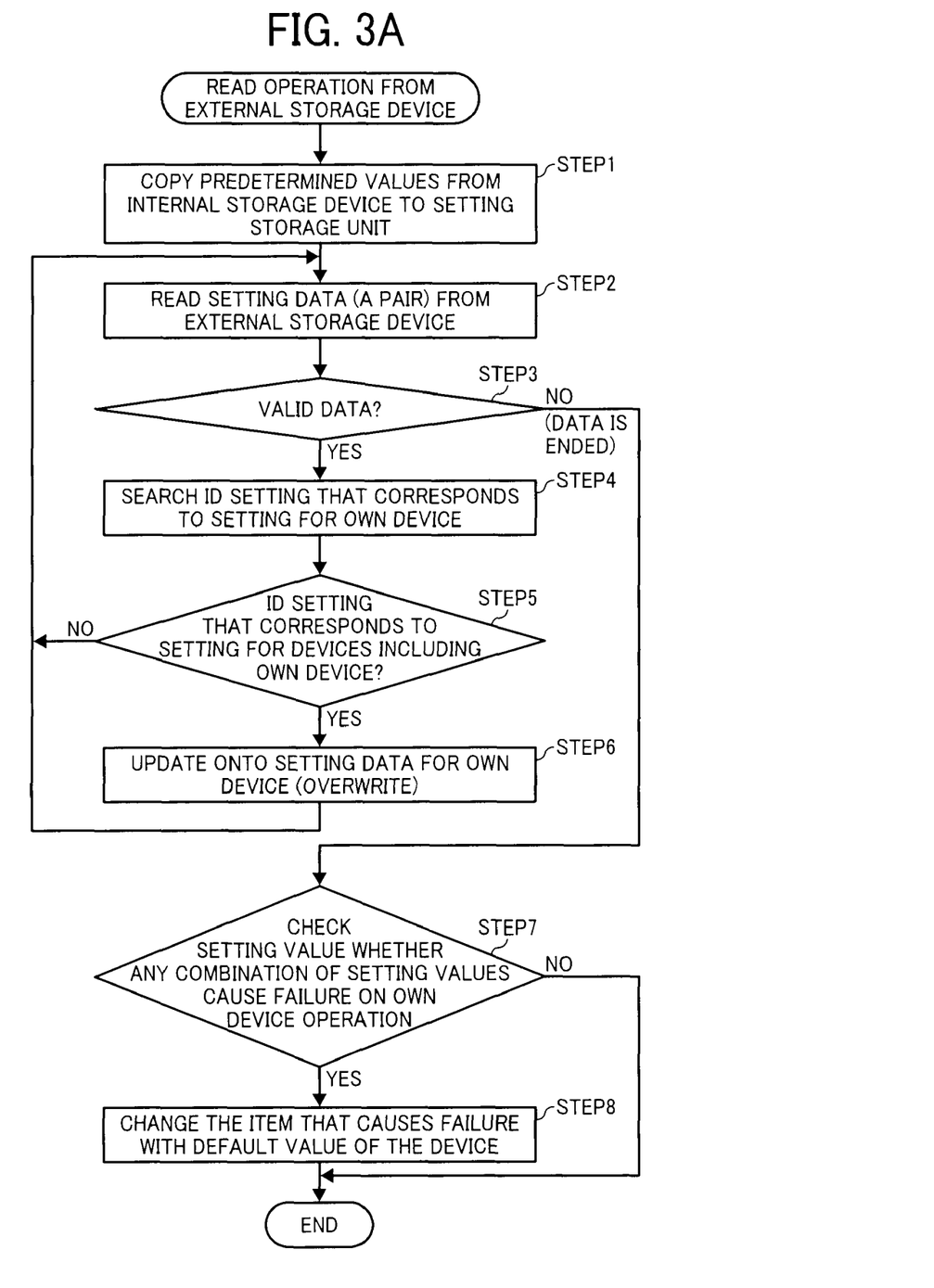
FIGS. 3A and 3B are flow charts illustrating an operation procedure process.
Figure 3B:
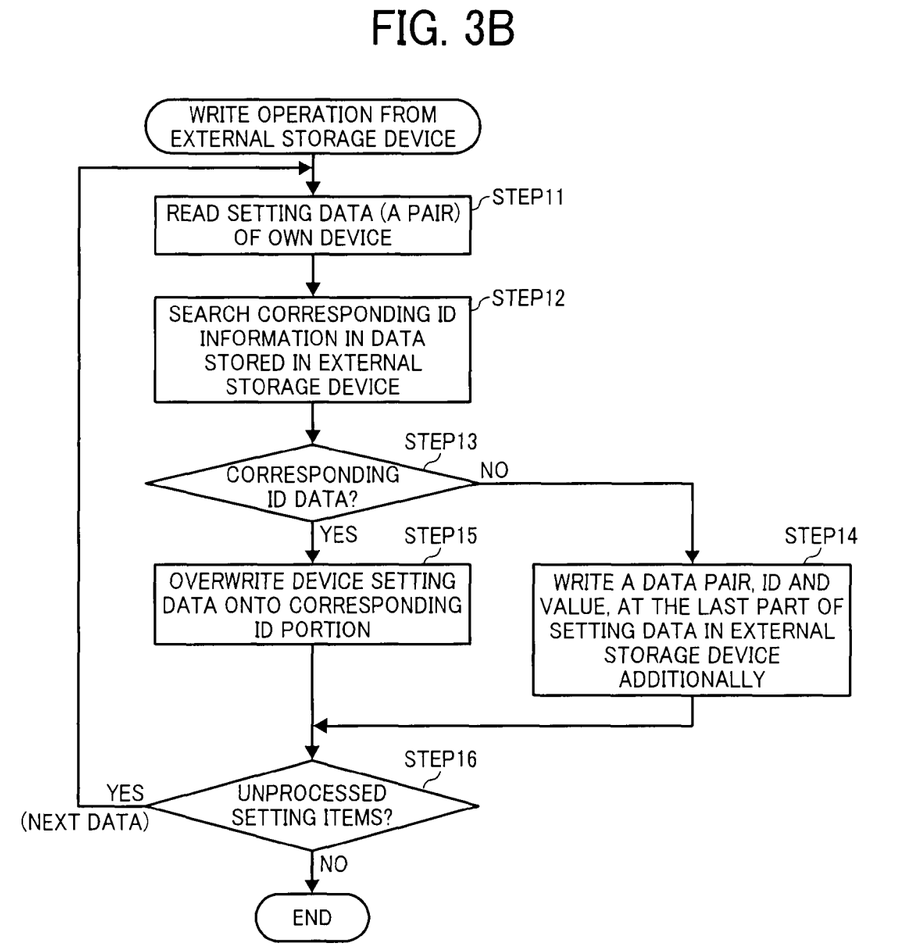

FIGS. 1A and 1B are block diagrams illustrating a configuration of a first example embodiment of an image forming device according to the present disclosure. FIG. 2A is an ID (identification) assign table for setting items. FIG. 2B is a table representing setting data for an image forming device A. FIG. 2C is a table representing a setting data status loaded for an image forming device B. FIG. 2D is a table representing initial values of the setting data for the image forming device B. FIG. 2E is a table representing reflected results of the setting data for the image forming device B. FIGS. 3A and 3B are flow charts illustrating an operation procedure process.

In FIGS. 1A and 1B, the image forming device includes a data processing unit 1, a data creation unit 2, a data interpretation unit 3, an input control unit 4, a data storage control unit 5, an internal storage device 6, an external storage control unit 7, an external storage device 8, and a setting data storage unit 9. The data processing unit 1 controls an entire system and performs data processing to form an image using, for example, a CPU (Central Processing Unit) and a program. The data creation unit 2 creates data to be written into each storage device. The data interpretation unit 3 interprets data, for example, input data. The input control unit 4 controls input devices. The data storage control unit 5 controls write and read processes with respect to the data to be stored in the internal storage device 6 and the setting data storage unit 9. The internal storage device 6 may be a nonvolatile memory device. The external storage control unit 7 controls write and read processes with respect to the data to be stored in the external storage device. The external storage device 8 may be a nonvolatile memory card detachably provided. The setting data storage unit 9 is a memory device to store setting values.

Function and operation of the image forming device according to the first example embodiment are now described referring to FIGS. 1A and 1B.

First, operation of the image forming device is described.

FIG. 1A illustrates the functional block diagram of the image forming device. A basic configuration of the image forming device is equal to a conventional image forming device.

The image forming device further includes an operational panel, a RAM (Random Access Memory), a NV-RAM (Non-volatile Random Access Memory), a ROM (Read Only memory), a panel I/F (interface), an ENGINE I/F, a HOST I/F, a HDD (hard disc drive), a TIMER, an ENGINE and a memory card I/F. The RAM is a volatile memory such as DRAM (Dynamic Random Access Memory) and works as a main memory. The NV-RAM is a nonvolatile memory to store information concerning operating condition and history of the image forming device. The ROM stores a control program such as firmware and basic fonts used for printing. The operational panel is a user interface to enable the user can operate the image forming device and confirm an operational status of the image forming device. The ENGINE performs actual execution of an image-forming process. The memory card I/F is an input and output interface to the external storage device.

FIG. 1B is a diagram mainly illustrating the configuration of the functional block related to the data processing unit 1. The input control unit 4 interprets the input data sent from the operation panel, recognizes an instruction, for example, which button is pushed, and sends a recognition result to the data interpretation unit 3. The data interpretation unit 3 interprets information and understands a meaning of data, for example, the information sent from the external storage control unit 7. The data creation unit 2 creates data to be written into the external storage device 8 and the internal storage device 6.

The data storage control unit 5 writes the data from the data creation unit 2 into the internal storage device 6, and obtains necessary data from the internal storage device 6. The external storage control unit 7 writes the data from the data creation unit 2 into the external storage device 8, and obtains necessary data from the external storage device 8. The internal storage device 6 stores setting information and device number information. The internal storage device 6 is detachably attached and can be used to write data. Any type of external storage device can be employed if the storage device is detachable, for example, a memory card.

In this embodiment, common setting information that is shared by a plurality of image forming devices and specific setting information that is effective to a specific image forming device are handled separately at a data table. The setting data includes identifying information that identifies a type of an identifying item and a setting value as a pair, and is stored in the internal storage device 6. The external storage control unit 7 communicates with the external storage device 8 by inputting and outputting the setting data.

The setting data read from the external storage device 8 is selected based on a predetermined criteria and is then written into the setting data storage unit 9. Namely, valid and consistent setting data read from the external storage device 8 is selected, and is overwritten onto an initial setting value or a current setting value stored in the setting data storage unit 9. If there is a possibility that the setting data causes an improper operation, the initial setting value is used.

Referring to FIG. 2A, the setting data is described. The data to store the setting value in the external storage device 8 is arranged as a data table that includes a pair consisting of a setting ID and a value. The setting ID is a general setting item.

If the setting ID is valid when the setting ID is transferred among image forming devices, a specific ID is assigned to represent that the setting ID is common. In this example embodiment, a prefix "COM-" is added on top of the ID.

Meanwhile, another type of specific ID is assigned for a setting item to identify the image forming device, if the setting ID is valid only for an equivalent image forming device and could possibly cause an improper operation. In this example embodiment, a prefix "A-" is added to the ID for an image forming device A, and a prefix "B-" is added to the ID for an image forming device B. Alternatively, in another example image forming device, a letter is used. Further, in yet another alternative example image forming device, a number may be used, for example, a number in the 10000s may be used for the image forming device A, and a number in the 20000s may be used for the image forming device B.

Referring to FIG. 2B, the setting data for the image forming device A is described. "COM-004" is shared setting data among a plurality of the image forming devices. Since the image forming device A does not operate a 180 rotation function, the image forming device A does not have the setting data "COM-004". As a result, when the paired ID and value are stored in the external storage device 8, it is presumed that there is no such setting data. Therefore, when the setting data is being stored in the external storage device 8 in which data is empty, the setting data is equal to the setting data shown in FIG. 2B.

Referring to FIGS. 2C, 2D and 2E, a loading process of the setting data is described.

When the setting information stored in the external storage device 8 is loaded to the image forming device, the ID of the setting item is checked from the top of the data stored in the external storage device 8. If a corresponding setting item is included in the data table of the internal storage device 6, a setting value stored as a pair with the ID of the setting item is employed. When the data stored in the image forming device A is loaded into the image forming device B, a loading result is shown in FIG. 2C. If the image forming device B does not have a double-side printing function or does not need a setting value, information "COM-003" stored in the image forming device A is ignored. Further, setting data for tray paper type and tray paper size is also ignored and is not loaded.

In the image forming device B, since the setting data "COM-004" for the 180 degree rotation function and the setting data for tray paper type and tray paper size are not stored, the setting data are not loaded. As shown in FIG. 2D, predetermined data is employed if no corresponding data is stored. When the predetermined data is an initial value, the data is as follows: If the initial value for the image forming device B is shown in FIG. 2D, a loading result of the data shown in FIG. 2B is shown in FIG. 2E. The setting data to be reflected in the operation is stored in the setting data storage unit 9 (setting RAM) at start-up of the image forming device, and is referred to when the setting data is necessary to control the operation. The setting data storage unit 9 is a work-area memory Referring to FIGS. 3A and 3B, an operational procedure to reflect the setting value is described.

At the start-up of the image forming device, predetermined values for the image forming device stored in the internal storage device 6 such as the ROM and the NV-RAM are copied to a working area in the setting data storage unit 9. As previously described, the setting data is read sequentially from the external storage device 8 and the valid setting data is only overwritten. The predetermined value may be an initial value for the image forming device, or it may be a current setting value that a user sets arbitrarily. The initial values are generally values set at shipping from a factory. The initial values are set so as not to cause an improper operation under any combination of device state and setting condition.

Information of a condition under which an improper operation is incurred is stored in memory such as ROM. Based on the information, the setting data stored in the external storage device 8 is loaded. If setting data that causes an improper operation when the setting data is reflected is found by a search, the setting value of the setting item is not employed but the initial value is employed instead.

An example of such improper operation is now described.

The image forming device does not perform printing operation when a paper size setting is set to be a size more than A4 for an image forming device that performs a double-side printing up to the A4 size, and a double-side printing setting is set "ON". In this case, an initial setting is employed to avoid the improper operation. Namely, a double-side printing setting is set to "OFF".

In the read process from the external storage device 8, as shown in FIG. 3A, a predetermined value is copied from the internal storage device 6 to the setting data storage unit 9 provided for reflection operation in Step 1. In Step 2, a pair of setting data is read from the external storage device 8. In Step 3, the setting data is checked to determine whether or not valid setting data is included. If valid setting data is included, it is checked whether or not an ID setting data corresponding to a setting data valid for the image forming device in question is included in Step 4. In Step 5, it is checked whether or not the ID is a corresponding ID to the image forming device in question. If the ID is not the corresponding ID to the image forming device in question, processing returns to Step 2. If the ID is the corresponding ID to the image forming device in question, the ID is overwritten to reflect the setting information. Then, processing returns to Step 2.

If the valid setting data is not included and the data to be checked is ended, it is checked whether or not the setting information that causes an improper operation on the image forming device in question with any combination of the setting data is included in Step 7. If such setting data is not included, processing ends. If such setting data is included, the setting value of the item is changed to an initial value in Step 8.

In write process to the external storage device 8, as shown in FIG. 3B, a pair of setting data for the image forming device in question is read in Step 11. In Step 12, it is searched whether or not ID information corresponding to the setting data of the external storage device 8 is included. In Step 13, it is checked whether or not ID corresponding to the setting data is included. If no such ID is included, a pair consisting of ID and value is added at the last portion of the setting data of the external storage device 8 in Step 14. If such ID is included, the setting data of the image forming device is overwritten on setting value of the corresponding ID in Step 15. In Step 16, it is checked whether or not unprocessed setting items remain. If an unprocessed setting item remains, processing returns to Step 11. If no unprocessed setting items remains, processing ends.

As described above, in the first example embodiment, the image forming device is controlled by sorting the common setting information that is valid among a plurality of image forming devices and specific setting information that is valid only for a specific image forming device. The valid setting information among setting information read from external storage device is uniquely selected to employ for an image forming device operation. Accordingly, the valid setting information is transferred even among image forming devices each of which uses different setting data format.

An image forming device according to a second example embodiment is now described.

In the image forming device according to the second example embodiment, setting information stored in an internal storage device is written into an external storage device. Further, setting information stored in the external storage device is selectively overwritten onto the setting information stored in the internal storage device in accordance with a renewal flag.

A configuration of the image forming device according to the second example embodiment is basically similar to the image forming device according to the first example embodiment. However, a renewal method to renew a setting information data table is different from the method in the image forming device according to the first example embodiment.

Figure 4A:
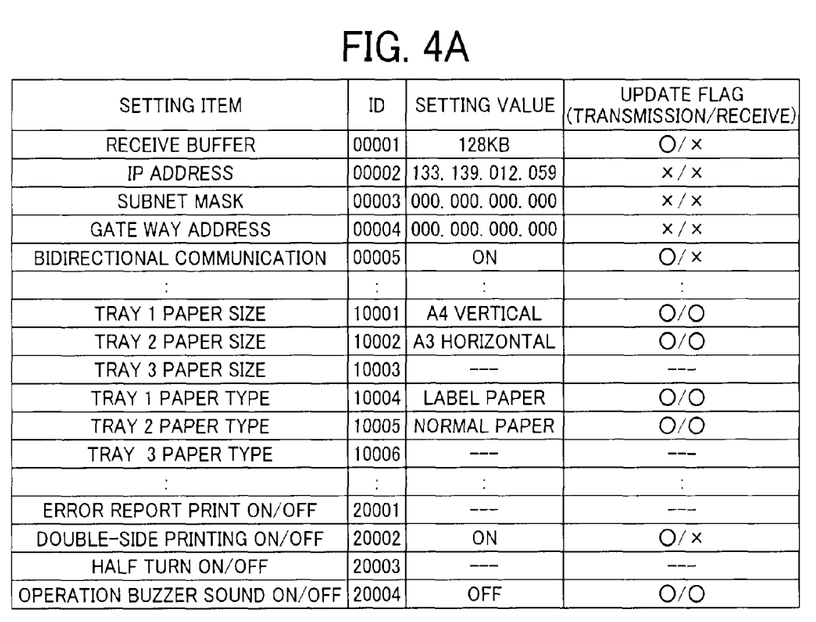
FIG. 4A is a setting information data table stored in the internal storage device of the image forming device according to a second example embodiment.
Figure 4B:
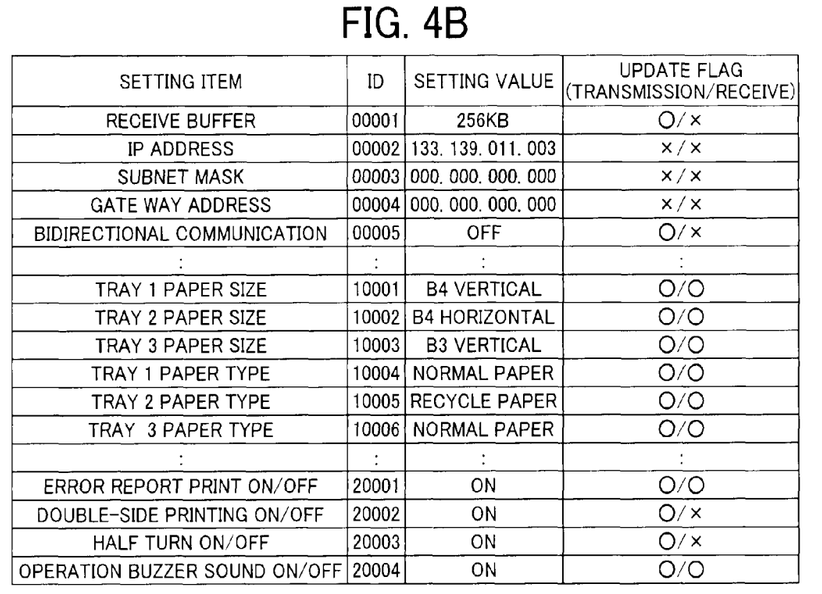
FIG. 4B is a setting information data table before the setting information is overwritten.
Figure 5A:
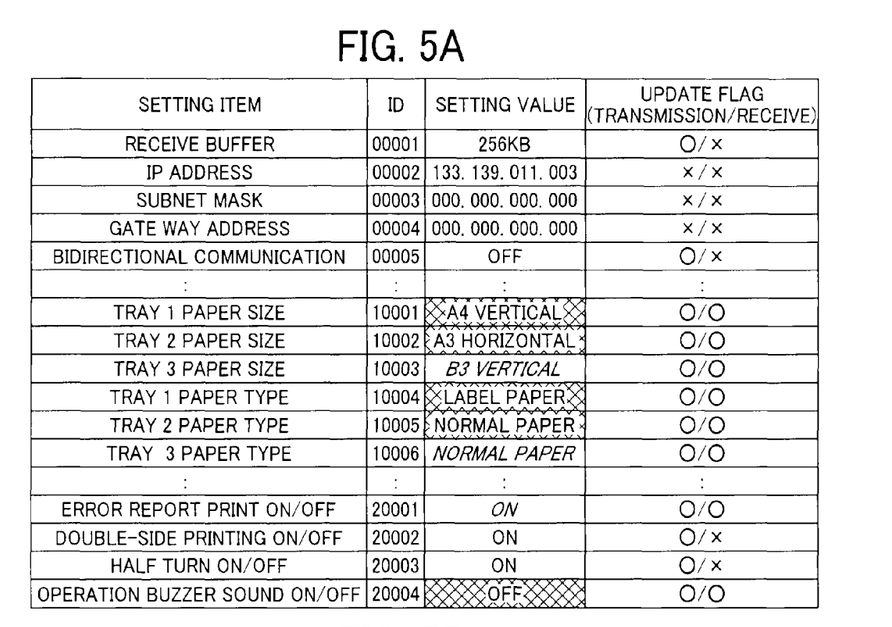
FIG. 5A is a setting information data table after the setting information is overwritten in accordance with renewal flags.
Figure 5B:
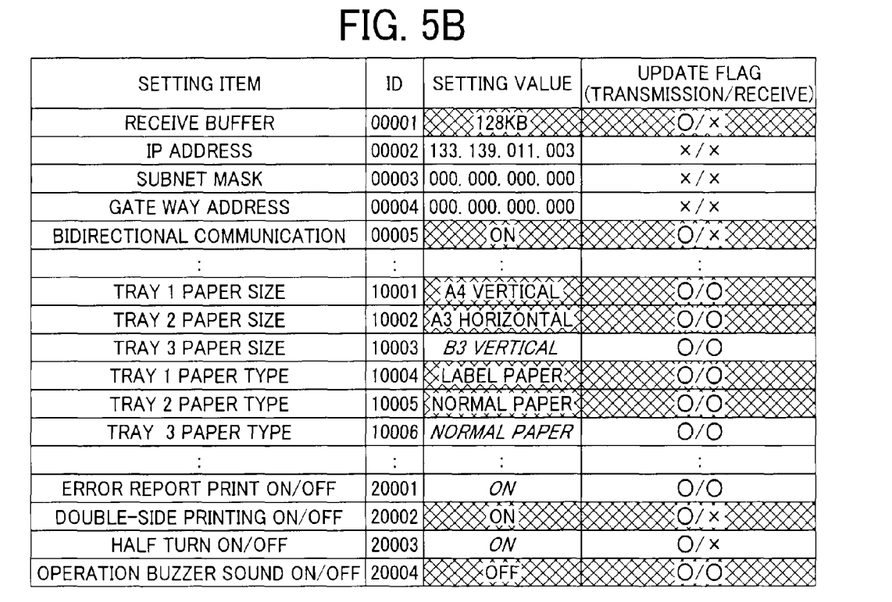
FIG. 5B is another setting information data table after the setting information is overwritten in accordance with the renewal flags.

FIG. 4A is a setting information data table stored in the internal storage device of the image forming device according to the second example embodiment. FIG. 4B is a setting information data table before overwrite-operation of the setting information. FIG. 5A is a setting information data table after the overwrite-operation of the setting information in accordance with the renewal flag. FIG. 5B is another setting information data table after the overwrite-operation of the setting information in accordance with the renewal flag.

Figure 6A:
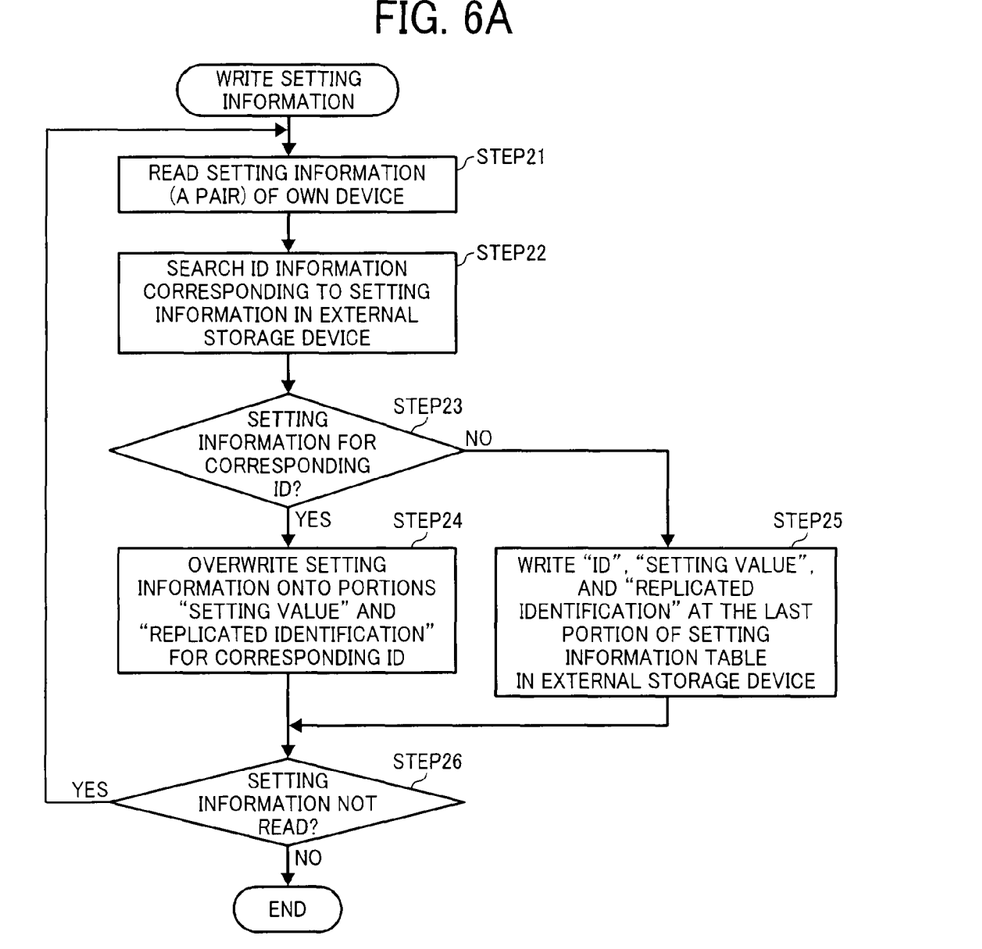
FIG. 6A is a flow chart illustrating a write operation process to write the setting information to the external storage device.
Figure 6B:
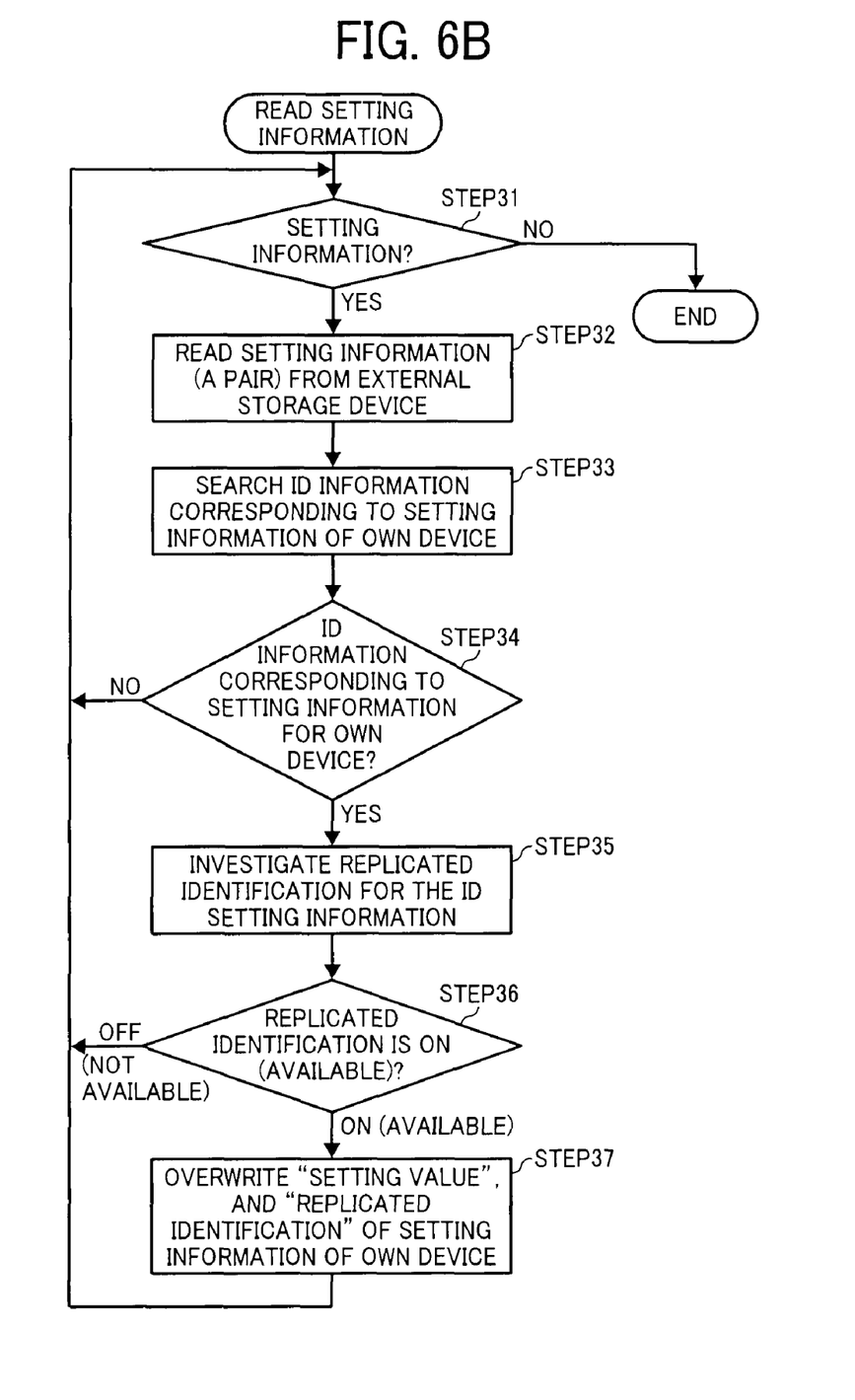
FIG. 6B is a flow chart illustrating a read operation process to read the setting information from the external storage device.
Figure 6C:
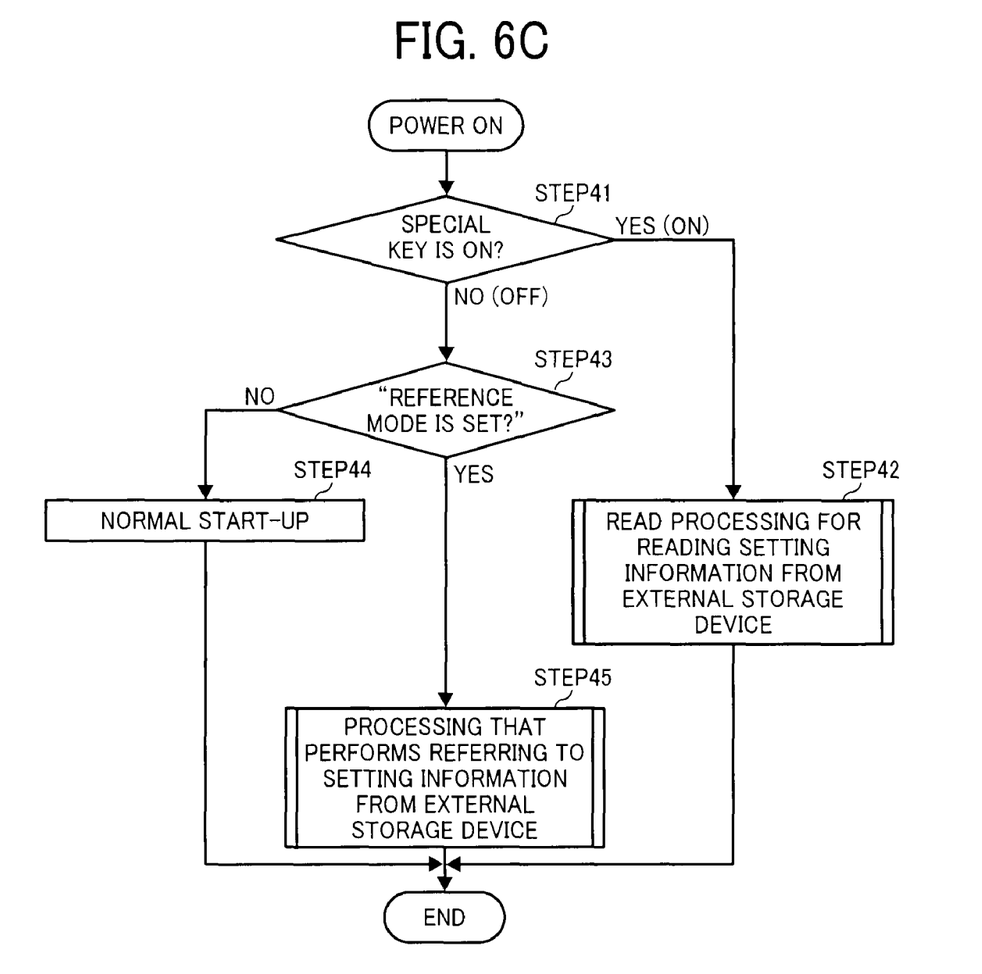
FIG. 6C is a flow chart illustrating a processing procedure at start-up.

FIG. 6A is a flow chart illustrating a write operation to write the setting information to the external storage device. FIG. 6B is a flow chart illustrating a read operation to read the setting information from the external storage device. FIG. 6C is a flow chart illustrating a processing procedure at start-up.

A description is now given of function and operation of the image forming device according to the second example embodiment, starting with an outline of the function of the image forming device. The function of the image forming device according to the second example embodiment is basically the same as the function of the image forming device according to the first example embodiment. However, unlike in the image forming device according to the first example embodiment, in the image forming device according to the second example embodiment, a renewal flag is provided at each setting item of the setting data.

In this image forming device, common setting information that is shared by a plurality of image forming devices and specific setting information that is effective only for a specific image forming device are handled separately. Therefore, each flag indicating transmit-permission and receive-permission is included at each item of the setting information. Accordingly, either one of transmit-permission and receive-permission information may be employed, or both types of permission information may be employed.

Setting data that comprises a variety of setting information for the image forming devices are stored in the internal storage device 6 shown in FIG. 1B. The setting information includes ID, setting value, and renewal flag as a group. The setting data read from the external storage device 8 is written into the internal storage device 6 in accordance with the transmit-permission information, or the receive-permission information of the renewal flag. An overwrite condition is determined in advance so that the overwrite-operation is performed under the transmit-permission or the receive-permission information of the renewal flag.

If the setting information is to be written in the external storage device 8, or to be read from the external storage device 8, the external storage device 8 is inserted before the start-up of the image forming device. Further, for example, when power supply is turned on with a special key continuously depressed, operation starts after the setting information stored in the external storage device 8 is overwritten on the internal storage device 6. Furthermore, it is also possible for operation to start after the setting information stored in the external storage device 8 is not overwritten onto the internal storage device 6 but is written into the setting data storage unit 9. It is selectively determined to operate either based on the setting information overwritten on the internal storage device 6 or by referring to the setting information stored in the external storage device 8.

Start-up operation is determined in advance to operate either in a normal mode or in a reference mode. In the normal mode, the image forming device starts up referring to the setting information stored in the internal storage device 6. In the reference mode, the image forming device starts up referring to the external storage device 8. However, in either mode, when a menu-key having a function title "store setting information in the external storage device" is pushed, the setting information is stored in the external storage device.

Referring to FIGS. 4A, 4B, and 5A, the overwrite-operation in accordance with the receive-permission information of the renewal flag is described. It is determined whether or not the setting data should be overwritten to renew in accordance with the receive-permission information of the renewal flag at an image forming device to be set. When the data will cause an improper operation, the permission information is set to be non receive-permission (X) that refuses overwrite-operation.

FIG. 4A is a setting information table stored in the internal storage device 6 of the image forming device A. An indication " - - - " indicates that no setting information is in the image forming device A. FIG. 4B is a setting information table of the image forming device B before the overwrite-operation of the setting information. FIG. 5A is a setting information table of the image forming device B after the overwrite-operation of the setting information in accordance with the receive-permission information of the renewal flag. Setting information in a shaded region represents the setting information that is overwritten. As for setting information shown in italics, the setting value before the overwrite-operation is maintained even if the renewal flag indicates a receive-permission because the setting value is not included in the setting information.

The setting information table stored in the internal storage device of the image forming device A is stored in the external storage device. If the setting information table of the external storage device is empty, the setting information table stored in the internal storage device of the image forming device A is directly stored in the external storage device. When the setting information table stored in the external storage device is overwritten to the internal storage device of the image forming device B, ID of the setting information is read from the top of the setting information table of the internal storage device.

When corresponding setting information is included in the internal storage device, i.e., corresponding ID is included, the renewal flag is checked. Only when the receive-permission is set in the renewal flag is the setting value stored corresponding to the ID of the setting information table of the external storage device overwritten in the internal storage device. When the setting information stored in the image forming device A is overwritten in the internal storage device of the image forming device B, the setting information table shown in the FIG. 5A represents the setting information in the internal storage device of the image forming device B. Setting information in the shaded region in FIG. 5A represents the setting information that is overwritten. As for setting information shown in italics, the setting value before overwrite operation is maintained even if the renewal flag indicates a receive-permission (o) because the setting value to be renewed is not included in the setting information.

Specifically, as for a tray 1 paper size item, setting value [B4 vertical] of FIG. 4B is overwritten and is changed to [A4 vertical] of FIG. 4A since the renewal flag indicates a receive-permission (o). In a receive buffer item of FIG. 5A, setting value is maintained at [256 KB] of FIG. 4B since the renewal flag indicates non-receive-permission (X). In a tray 3 paper type item of FIG. 5A, setting value is maintained as setting value [normal paper] since the renewal flag indicates receive-permission (o) but the setting value of FIG. 4A is " - - - ".

Referring to FIGS. 4A, 4B, and 5B, the overwrite-operation in accordance with the transmission-permission information of the renewal flag is described.

It is determined whether or not the setting data should be overwritten to renew in accordance with the transmission-permission information of the renewal flag at an image forming device to be set.

Setting data such as device address should be treated carefully and may cause disadvantage when the setting data is copied. Further, setting data may be meaningless when the setting data is set in another device. Accordingly, non-receive-permission (X) is set for the setting data described above. However, when the same address is set to an alternate image forming device, the setting value of the renewal flag is temporally changed and is then returned to the original setting value after completion of a setting operation. Or, an operation mode to copy all the setting values may be prepared instead.

When the setting information table of the image forming device B shown in FIG. 4B is overwritten in accordance with the transmission-permission information of the renewal flag of the setting information table stored in the internal storage device of the image forming device A shown in FIG. 4A, the setting information table of the image forming device B shown in FIG. 4E becomes a setting information table shown in FIG. 5B. The setting information in the shaded region represents the setting information that is overwritten. As for setting information shown in italics, the setting value before overwrite-operation is maintained because the setting information with an ID corresponding to an ID for the setting information stored in the internal storage device is not included in the setting information stored in the external storage device.

The setting information table stored in the internal storage device of the image forming device A shown in FIG. 4A is copied directly to the external storage device. When the setting information stored in the external storage device is copied to the internal storage device of the image forming device B, the ID of the setting information is checked from the top of the setting information table stored in the external storage device. If corresponding setting information is included in the setting information table of the internal storage device, i.e., a corresponding ID is included, operation proceeds in the following way.

The setting value and the renewal flag corresponding to the ID is overwritten to the setting value and the renewal flag of the internal storage device only when the renewal flag indicates receive-permission (o). The setting value and the renewal flag is not overwritten when the renewal flag indicates non receive-permission (X).

When the setting information stored in the image forming device A is overwritten to the internal storage device of the image forming device B, the setting information table of the image forming device B becomes a setting information table shown in FIG. 5B. In FIG. 5B, the setting information in the shaded region represents the setting information that is overwritten. As for setting information shown in italics, the setting information before the overwrite-operation is maintained because the setting information with an ID corresponding to an ID for the setting information stored in the internal storage device is not included in the setting information stored in the external storage device.

More specifically, as for a tray 1 paper type item of FIG. 5B, the setting value is overwritten and is changed to the setting value [label paper] of FIG. 4A from the setting value [normal paper] of FIG. 4B since the renewal flag of FIG. 4A indicates a receive-permission (o). In an IP-address item of FIG. 5B, the setting value is maintained at [133. 139. 011. 003] of FIG. 4B since the renewal flag indicates non-receive-permission (X). In an error report print on/off item, the renewal flag is not set because the setting value of FIG. 4A is " - - - ".

Accordingly, the setting value of FIG. 5B is kept to be [on] that is set in FIG. 4B. In a bi-directional communication item of FIG. 5B, the setting value is overwritten and is changed to the setting value [on] of FIG. 4A from the setting value [off] of FIG. 4B since the renewal flag of FIG. 4A indicates receive-permission (X) but also indicates transmission-permission (o).

Referring to FIG. 6A, an operational procedure to write the setting information of the internal storage device to the external storage device is described. One example is an operation in which the setting information stored in the NV-RAM is rendered and is written to a SD (Secure Digital) card.

In Step 21, a pair of setting data for the device in question is read in Step 11. In Step 22, ID is searched to determine whether or not ID information corresponding to the setting information of the external storage device is included. In Step 23, ID is checked to determine whether or not corresponding ID information is included. If no ID information is included, an ID, setting value, and renewal flag are added at the end of the setting information table of the external storage device in Step 24. If the ID is included, the setting information is overwritten at the corresponding ID setting value and renewal flag in Step 25. In Step 26, it is checked whether any unprocessed items remain. If an unprocessed item remains, processing returns to Step 21. If no unprocessed item remains, processing ends. Further, if data table of the setting information is not included in the external storage device, a judgment result in Step 23 is always "No". Processing of Step 25 is performed for all the items of the setting information.

Referring to FIG. 6B, operational procedure to read the setting information from the external storage device, and to write the setting information in the internal storage device is described. One example is an operation in which the setting information is read from the SD card and is written to the NV-RAM.

In Step 31, it is checked whether or not setting information is included in the external storage device. If no setting information is included, processing ends. If setting information is included, a pair of pieces of setting information is read from the external storage device in Step 32. Corresponding ID items are searched on the setting information of the external storage device. In Step 33, ID is checked to determine whether or not corresponding ID information is included. If no ID information is included, processing returns to Step 31. If the ID is included, renewal flag of the ID setting information is checked in Step 35. In Step 36, it is checked whether or not the renewal flag indicates renewal permission. If the renewal flag indicates non renewal permission, processing returns to Step 31. If the renewal flag indicates renewal permission, the setting value and the renewal flag of the setting information are overwritten in Step 37. There are two types of the renewal flags to be checked in Steps 35 and 36, i.e., transmit-permission information and receive-permission information. Different overwrite results may be obtained depending on the renewal flag to be checked as previously described in detail.

Referring to FIG. 6C, operational procedure at start-up is described.

The external storage device is inserted before start-up of the image forming device when necessary. In Step 41, it is checked whether or not a special key is pushed. In this image forming device, it is possible to operate after overwrite-operation of the setting information stored in the external storage device to internal storage device if power supply is turned on with the special is continuously depressed.

Alternatively, a menu key indicating "store setting information in the external storage device" may be prepared. In this case, when the menu key is pushed, the setting information is stored in the external storage device. If the special menu key is on, the setting information is read from the external storage device and is written in the internal storage device in Step 42. If the special menu key is not on, a check is made to determine whether or not an external reference mode is set in Step 43.

It is determined in advance under which mode a start-up operation is to be performed, that is, a normal mode or the external reference mode. As described previously, in the normal mode, the image forming device starts up referring to the setting information stored in the internal storage device. In the external reference mode, the image forming device starts up referring to the external storage device. If the external reference mode is not set, the image forming device starts up with the normal mode in Step 44. If the external reference mode is set, the image forming device starts up referring to the external storage device in Step 45.

In the image forming device according to the second example embodiment, the setting information stored in the internal storage device is written into the detachable external storage device. Further, the setting information stored in the external storage device is selectively overwritten onto the setting information stored in the internal storage device in accordance with a renewal flag. Accordingly, the information is easily transferred among those image forming devices that use setting data with different formats by using the external storage device.

The above-described embodiments are illustrative and do not limit the present invention. Thus, numerous additional modifications and variations are possible in light of the above teachings. For example, elements at least one of features of different illustrative and exemplary embodiments herein may be combined with each other at least one of substituted for each other within the scope of this disclosure and appended claims. Further, features of components of the embodiments, such as the number, the position, and the shape, are not limited the embodiments and thus may be set as preferred. It is therefore to be understood that, within the scope of the appended claims, the disclosure of this patent specification may be practiced otherwise than as specifically described herein.

What is claimed is:

1. An image forming device comprising:
    a control unit configured to sort common setting information valid among a plurality of image forming devices and specific setting information valid for a specific image forming device;
    an internal storage device configured to store setting data that includes a pair of IDs indicating a type of setting item and a setting value;
    an external storage device controller configured to input and output the setting data with a detachable external storage device; and
    a selective-write device configured to select and write the setting data read from the external storage device based on predetermined criteria.

2. The image forming device as described in claim 1, wherein the selective-write device further comprises an overwrite device to select a setting value that is valid and consistent from the setting data read from the external storage device, and to overwrite the selected setting value onto an initial value or current setting value stored in a setting storage device.

3. The image forming device as described in claim 1, wherein the setting data includes a renewal flag and the image forming device further comprises:
    a renewal unit configured to write the setting data read from the external storage device to the internal storage device in accordance with transmit-permission information or receive-permission information of the renewal flag;
    an overwrite setting unit configured to determine criteria to permit overwriting under predetermined permission information of the renewal flag.

4. The image forming device as described in claim 3, wherein the image forming device further comprises:
    a writing unit configured to write the setting data of the external storage device to a setting storage device;
    a mode setting unit configured to selectively set the image forming device to one of a normal operation mode to operate in accordance with the setting data of the setting storage device, a renewal mode to renew the setting data of the setting storage device, and an external reference mode to operate after writing the setting data of the external storage device.

5. A control method of controlling an image forming device, comprising the steps of:
    sorting common setting information valid among a plurality of image forming devices and specific setting information valid for a specific image forming device;
    storing setting data that includes a pair of IDs indicating a type of setting item and a setting value;
    selecting a setting value that is valid and consistent from the setting data read from an external storage device; and
    overwriting the setting value onto an initial value or current setting value stored in a setting storage device.

6. The control method as described in claim 5, further comprising the steps of:
    outputting the setting data to a detachable external storage device; and
    reading the setting data from the detachable external storage device.

7. A control method of controlling an image forming device, comprising the steps of:
    sorting common setting information valid among a plurality of image forming devices and specific setting information valid for a specific image forming device;
    storing setting data that includes setting data of identification information indicating a type of setting item, setting values, and a renewal flag;
    setting criteria to permit overwriting at predetermined permission information of the renewal flag; and
    writing the setting value in an internal storage device in accordance with transmit-permission information or receive-permission information of the renewal flag.

8. The control method as described in claim 7, further comprising the steps of:
    outputting the setting data to a detachable external storage device; and
    after setting criteria to permit overwriting at predetermined permission information of the renewal flag, reading the setting data from the external storage device.

* * * * *